United States Patent Office.

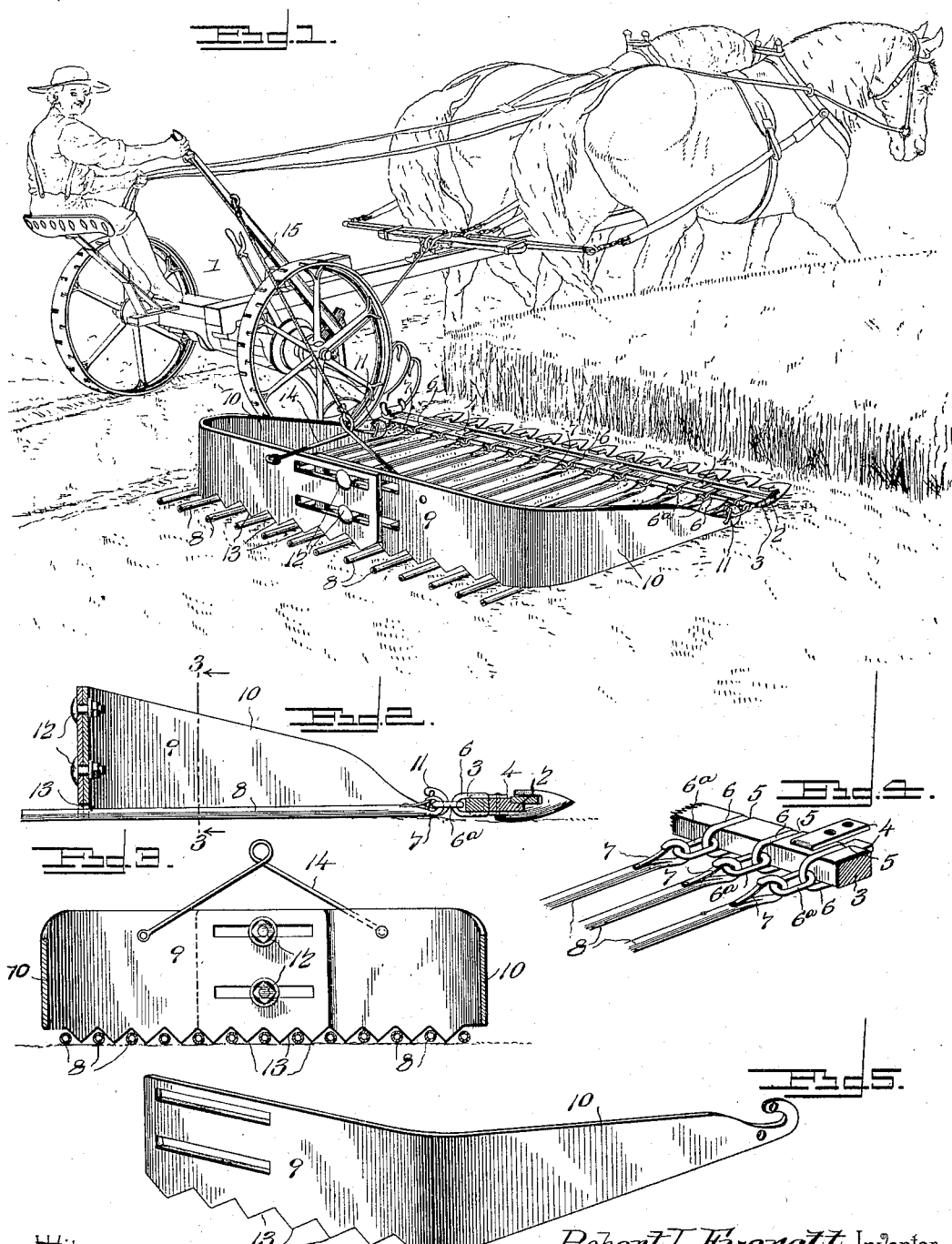

ROBERT L. EVERETT, OF HARRISBURG, NEBRASKA.

GATHERING ATTACHMENT FOR MOWING-MACHINES.

SPECIFICATION forming part of Letters Patent No. 639,220, dated December 19, 1899.

Application filed October 20, 1898. Serial No. 694,105. (No model.)

*To all whom it may concern:*

Be it known that I, ROBERT L. EVERETT, a citizen of the United States, residing at Harrisburg, in the county of Banner and State of Nebraska, have invented a new and useful Gathering Attachment for Mowing-Machines, of which the following is a specification.

This invention relates to gathering or bunching attachments for mowing-machines; and it has for its object the provision of a simple and efficient attachment for a mowing-machine whereby the hay or grass in being cut can be deposited in bunches over the field instead of thinly scattered, as is the case where the mowing-machine is operated in the usual manner and without any attachment of the character contemplated by the present invention.

To this end the invention also contemplates a gathering or bunching attachment that can be readily attached to and detached from any ordinary mowing-machine and which will operate in any kind of grain or hay to provide for gathering and raking up the cut grain without dirt or trash and depositing the same in bunches or rows at any desired point.

With these and other objects in view, which will readily appear as the nature of the invention is better understood, the same consists in the novel construction, combination, and arrangement of parts hereinafter more fully described, illustrated, and claimed.

While the invention is necessarily susceptible to modifications without departing from the scope thereof, still the preferred embodiment is illustrated in the accompanying drawings, in which—

Figure 1 is a perspective view of the gathering attachment shown applied to an ordinary mowing-machine. Fig. 2 is a longitudinal sectional view of the attachment. Fig. 3 is a cross-sectional view on the line 3 3 of Fig. 2. Fig. 4 is an enlarged detail perspective view of a portion of the attaching-bar, showing the loose connection of the trailing platform-slats therewith. Fig. 5 is a detail in perspective of one of the L-shaped sections of the combined guard and dump-rake.

Referring to the accompanying drawings, the numeral 1 designates an ordinary mowing-machine having the usual finger-bar 2, and the attachment contemplated by the present invention is designed to be arranged for use directly in rear of the said finger-bar, so as to catch all of the grain as it falls from the cutter.

The working parts of the gathering attachment are carried by an attaching-bar 3, which attaching-bar is adapted to be arranged at the rear edge of the finger-bar 2 and extend longitudinally thereof from end to end. The said attaching-bar 3 is connected directly to the finger-bar 2, preferably by means of attaching clips or straps 4, which embrace the rear edge of the bar 2 and are fastened thereto by means of bolts or other suitable fasteners which permit the attaching-bar 3 to be readily attached to and disconnected from the finger-bar of the mower. The attaching-bar 3 of the attachment is provided in its front edge with a transverse series of link-receiving notches 5, which loosely receive therein the connecting-links 6 and the supplemental links 6ª, which are detachably engaged by the coupling-snaps 7, fitted to the front ends of the trailing platform-slats 8. By reason of this construction a slat may be readily replaced when broken without disturbing the other parts of the attachment, while at the same time permitting the entire attachment to be readily attached to and detached from the machine whenever desired without the necessity of manipulating a single bolt.

The trailing platform-slats 8 may be made of gas-pipe or wooden or metal strips and are arranged in series at regular distances apart in rear of the attaching-bar 3 to form what might be properly termed a "slatted" platform, which slatted platform is the bottom of the attachment, onto which the cut grain falls as the mowing-machine advances in its work. The rear ends of the platform-slats 8 are entirely free, so that such slats will loosely trail from the attaching-bar 3, and thereby readily adjust themselves to any unevennesses or irregularities of the ground, while at its same time serving to hold the accumulations of cut grain until it is desired to dump the same in bunches or rows.

The grain is confined on the slatted platform composed of the trailing slats 8 by an approximately U-shaped combined guard and dump-rake 9. By reason of its U shape the said combined guard and dump-rake is necessarily arched or bowed, and the side portions of said guard and rake, which portions are designated by the number 10, are of the tapering form and are loosely or pivotally connected at their front ends, as at 11, respectively, to the opposite extremities of the attaching-bar 3, thereby permitting the combined guard and rake to swing vertically to provide for dumping the load on the slatted platform when desired.

The combined guard and dump-rake 9 extends in rear of the bar 3 a distance nearly equaling the length of the trailing slats 8, so as to form the inclosing sides and ends of the platform to provide for holding the cut grain thereon, and said combined guard and rake is preferably formed of two substantially L-shaped sections having their contiguous ends overlapping and adjustably connected together by the bolt-and-slot connections 12. The bolt-and-slot connections 12 between the overlapping ends of the guard and rake sections permit the said guard and rake to be extended or contracted, and thereby increase or decrease the holding capacity of the attachment, as may be desired.

The substantially U-shaped guard and dump-rake 9 is provided at its rear lower edge with a plurality of rake points or notches 13, which are preferably of a substantial V shape and extend between the rear loose trailing ends of the platform-slats 8. It will therefore be observed that the rake-points of the combined guard and rake prevent the trailing slats from becoming crossed or otherwise displaced, while at the same time raking back onto the platform any cut grain that has a tendency to escape beneath the rear edge of the guard and rake. A lifting-bail 14 is attached to the rear upper edge of the combined guard and rake and has a rope or other equivalent connection 15 therewith, which is under the control of the driver, so that the said guard and rake may be raised and lowered at will, and when raised it will be understood that the accumulation of cut grain on the platform will be permitted to pass out onto the ground as the mowing-machine advances.

From the foregoing it is thought that the construction, operation, and many advantages of the herein-described attachment will readily appear to those skilled in the art without further description, and it will be understood that changes in the form, proportion, and the minor details of construction may be resorted to without departing from the principle or sacrificing any of the advantages of this invention.

Having thus described the invention, what is claimed as new, and desired to be secured by Letters Patent, is—

1. In a gathering attachment for mowing-machines, an attaching-bar adapted to be carried by the finger-bar of the machine and having a series of loose links, a plurality of trailing platform-slats provided at their front ends with snaps detachably engaging with said links, and a guard for holding the grain on the slats, substantially as set forth.

2. In a gathering attachment for mowing-machines, an attaching-bar adapted to be carried by the finger-bar of the mower and provided with a transverse series of notches, links loosely seated in said notches, a plurality of trailing platform-slats provided at their front ends with snaps, supplemental links hung on the other links and detachably engaged by said snaps, and a guard for holding the grain on the slats, substantially as set forth.

3. In a gathering attachment for mowing-machines, an attaching-bar carrying a plurality of loosely-trailing slats, connected therewith and adapted for independent universal movement with respect thereto, and a self-adjusting guard and rake similarly connected with the attaching-bar and provided at its lower edge with a plurality of rake-points extending between and spacing apart the said slats, substantially as set forth.

4. In a gathering attachment for mowing-machines, the combination of the attaching-bar carrying a platform for the cut grain, and an arched or bowed combined guard and rake formed of extensibly-connected sections and connected at its terminals to the ends of the attaching-bar, substantially as set forth.

5. In a gathering attachment for mowing-machines, the attaching-bar carrying a plurality of loosely-trailing platform-slats, and an arched or bowed guard and rake pivotally connected to the attaching-bar and resting on the slats, said guard and rake being provided with a plurality of rake-points extending between the rear loose ends of said slats, substantially as set forth.

In testimony that I claim the foregoing as my own I have hereto affixed my signature in the presence of two witnesses.

ROBERT L. EVERETT.

Witnesses:
C. J. CARLISLE,
C. M. WOODARD.